United States Patent
Auvenshine et al.

(10) Patent No.: US 10,749,748 B2
(45) Date of Patent: Aug. 18, 2020

(54) RANKING HEALTH AND COMPLIANCE CHECK FINDINGS IN A DATA STORAGE ENVIRONMENT

(71) Applicant: International Business Machines Corporation, Armonk, NY (US)

(72) Inventors: John J. Auvenshine, Tucson, AZ (US);
Per Lutkemeyer, Lystrup (DK);
Christian Sonder, Aarhus (DK);
Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/467,071

(22) Filed: Mar. 23, 2017

(65) Prior Publication Data

US 2018/0278477 A1  Sep. 27, 2018

(51) Int. Cl.
  *G06F 15/173* (2006.01)
  *H04L 12/24* (2006.01)
  *H04L 12/26* (2006.01)

(52) U.S. Cl.
  CPC .......... *H04L 41/0869* (2013.01); *H04L 41/12* (2013.01); *H04L 43/065* (2013.01); *H04L 41/14* (2013.01); *H04L 43/0811* (2013.01)

(58) Field of Classification Search
  None
  See application file for complete search history.

(56) References Cited

U.S. PATENT DOCUMENTS

| | | | |
|---|---|---|---|
| 6,006,016 A * | 12/1999 | Faigon | G06F 11/2252 714/26 |
| 7,487,381 B1 | 2/2009 | Beaman et al. | |
| 7,890,807 B2 | 2/2011 | Verbowski et al. | |
| 8,209,409 B2 * | 6/2012 | Mopur | G06F 11/008 709/223 |
| 2002/0143563 A1 * | 10/2002 | Hufford | G06F 19/325 705/7.38 |
| 2004/0225651 A1 * | 11/2004 | Musgrove | G06Q 30/0253 |
| 2005/0044443 A1 | 2/2005 | Magnaghi et al. | |

(Continued)

FOREIGN PATENT DOCUMENTS

JP  2009175913  8/2008

OTHER PUBLICATIONS

Wood et al., Impact of Misconfiguration in Cloud—Investigation Into Security Challenges, Retrieved from Internet: URL: http://infonomics-society.ie/wp-content/uploads/ijmip/published-papers/volume-1-2011/Impact-of-Misconfiguration-in-Cloud-Investigation-into-Security-Challenges.pdf, pp. 17-25.

*Primary Examiner* — Dhairya A Patel
(74) *Attorney, Agent, or Firm* — Schmeiser, Olsen & Watts, LLP; Mark Vallone

(57) ABSTRACT

A method and system. A health and compliance check report for a network including two or more devices is received. The report includes a list of health and compliance check findings at a particular time. Each finding indicates a determination of non-compliance of a subject device of the two or more devices with a predetermined requirement and includes a severity value associated with the determination of non-compliance of the subject device. For each finding in the report, a ranking value is determined based on the associated severity value and an importance value of one or more devices connected to the subject device.

17 Claims, 5 Drawing Sheets

(56) References Cited

U.S. PATENT DOCUMENTS

| | | | |
|---|---|---|---|
| 2008/0201468 A1* | 8/2008 | Titus | H04L 41/5009 709/224 |
| 2008/0235365 A1* | 9/2008 | Bansal | H04L 43/06 709/224 |
| 2010/0023933 A1* | 1/2010 | Bryant | G06Q 10/06 717/168 |
| 2013/0097183 A1 | 4/2013 | McCracken | |
| 2015/0066435 A1* | 3/2015 | Basu | H04Q 9/00 702/189 |
| 2015/0294245 A1* | 10/2015 | Nagar | G06Q 10/063 705/7.11 |
| 2016/0119381 A1* | 4/2016 | Holst | H04L 41/0856 726/1 |
| 2017/0222908 A1* | 8/2017 | Sevagapandian | H04L 45/02 |
| 2017/0295082 A1* | 10/2017 | Wu | H04L 41/0816 |
| 2018/0091392 A1* | 3/2018 | Richards | H04L 43/045 |
| 2020/0089561 A1* | 3/2020 | Laing | G06F 11/079 |

* cited by examiner

RANKING HEALTH AND COMPLIANCE CHECK FINDINGS IN A DATA STORAGE ENVIRONMENT

TECHNICAL FIELD

The present invention relates to the management of devices in a data storage environment or the like, and more specifically, to ranking health and compliance check findings according to an associated impact on the data storage environment.

BACKGROUND

Storage devices have been subject to compliance requirements.

SUMMARY

A method and associated computer system and computer program product, One or more processors of the computer system receive a health and compliance check report for a network comprising a plurality of devices, wherein the report comprises a list of health and compliance check findings at a particular time, each finding indicating a determination of non-compliance of a subject device of the plurality of devices with a predetermined requirement and including a severity value associated with the determination of non-compliance of the subject device. For each finding in the report, the one or more processors determine a ranking value based on the associated severity value and an importance value of one or more devices connected to the subject device.

BRIEF DESCRIPTION OF THE DRAWINGS

Example implementations of embodiments of the present invention will be described below with reference to the following drawings.

DETAILED DESCRIPTION

Figure 1:
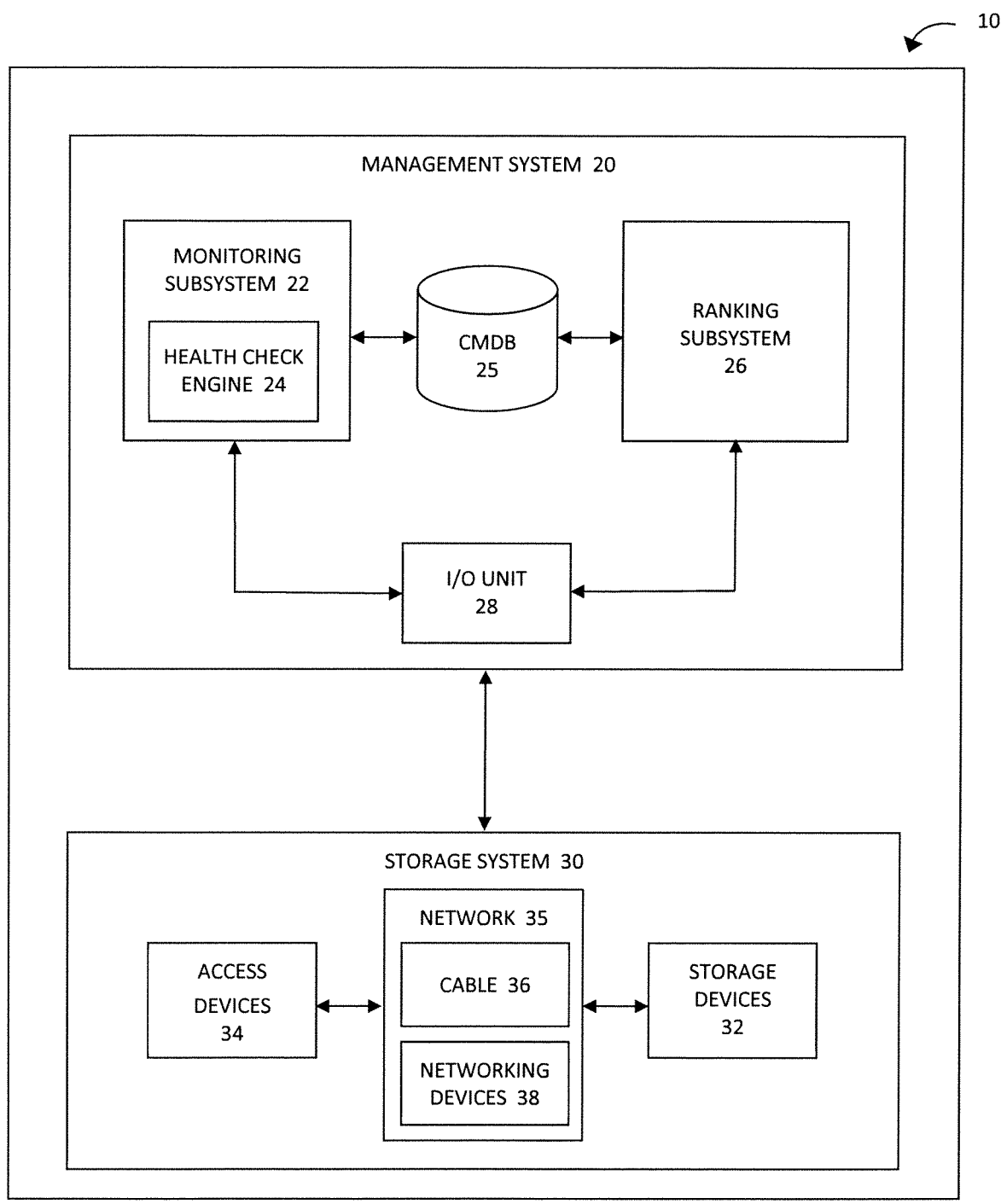
FIG. 1 is a high level block diagram of a data storage environment, in accordance with example implementations of embodiments of the present invention.

The following detailed description relates to the management of a data storage environment comprising storage devices (e.g., disk drives), storage networking devices (e.g., Storage Area Network (SAN) switches and gateways) and access devices providing client access to storage devices (e.g., servers) interconnected by a network for the communication of data according to a storage area network protocol (e.g., SCSI). As the skilled person will appreciate, the teachings of the present invention are not limited to use in a data storage environment, but may be used for the management of other types of data processing or communication devices in a networked environment.

Example implementations of the present invention include systems, methods and computer program products associated with a data storage environment or the like. The disclosed example implementations may be used for improved management of devices and systems for health and compliance, as described in further detail below. Unless otherwise stated herein, references to "time" are interned to encompass both points in time and time ranges. In the drawings, the same or similar features are assigned the same or similar reference numerals.

FIG. 1 is a high level block diagram of a data storage environment 10, in accordance with example implementations of embodiments of the present invention. The data storage environment 10 comprises a management system 20 configured for managing a storage system 30.

Storage system 30 comprises a plurality of data storage devices 32, and one or more storage access devices 34 (also called "access devices" herein), connected for data communication over a network 35. In particular, storage devices 32 and access devices 34 are connected to a storage area network 35 for the communication of data, for storage and retrieval, in accordance with a storage area network protocol (e.g., SCSI). Storage devices 32 may include disk drives, tape drives, solid state storage devices and any other device capable of storing data, whether now known or developed in the future. Storage access devices 34 use resources of storage devices 32 and may include host devices (e.g., servers), computers and other devices that access data, or otherwise consume resources, of storage devices 32, whether crow known or developed in the future. Storage area network 35 may include network cable 36, networking devices 38 such as storage area network (SAN) switches or gateways, and other components for providing network connectivity, whether now known or developed in the future.

Management system 20 comprises a plurality of modules, components and/or subsystems for managing storage system 30. In particular, management system 20 comprises a health and compliance monitoring subsystem 22 (also called "monitoring subsystem" herein) for monitoring parameters of devices of the storage system 30. For example, monitoring subsystem 22 may monitor configuration, security and/or operational state parameters of the storage devices 32, storage access devices 34 and/or networking devices 38 of the storage system 30 for compliance with one or more predetermined requirements or policies. Monitoring subsystem 22 may monitor devices of the storage system 30 either continually, periodically (e.g., daily), upon request by a user or otherwise, according to application and/or user requirements, by retrieving configuration, security and/or operational state data associated with one or more devices of the storage system 30.

Management system 20 further comprises a configuration management database (CMDB) 25. Monitoring subsystem 22 may store raw or processed data retrieved from the storage system 30 in the CMDB 25. Monitoring subsystem 22 may comprise a health check engine 24. Health check engine 24 may use the retrieved data for each device to perform a plurality of health and compliance checks (also called "health checks" of "checks" herein), Each health check evaluates whether the relevant device is compliant or non-complaint with a predetermined requirement (e.g., policy). The findings (i.e., results) of the checks may be stored by the health check engine 24 in the CMDB 25.

Monitoring subsystem 22 may use device configuration data stored in CMDB 25 to determine interconnections between devices of the storage system 30 and thus a topology of the storage area network 35. Such topology data may be stored in CMDB 25 and used by health check engine 24 for determining compliance with the one or more predetermined requirements, when performing a health check. Furthermore, monitoring subsystem 22 may use the findings stored in the CMDB 25 to generate a health check report comprising, for example, a list of checks for which a device is found to be non-compliant with a particular requirement and a corresponding "severity value" associated with the finding of non-compliance. As the skilled person will appreciate, the present invention may be implemented with any other suitable system for monitoring for health and compliance, whether now known or developed in the future.

Management system 20 further comprises a ranking subsystem 26 in accordance with example implementations of the present invention. Ranking subsystem 26 determines a "ranking value" for each finding of non-compliance from checks by the health check engine 24 of monitoring subsystem 22. The ranking value indicates the relative impact of the determination of non-compliance on the monitored storage system 30 (i.e., the relative effect of non-compliance on the desired performance of an enterprise data storage environment). As described in further detail below, the ranking value is determined based not only on the severity of the finding of non-compliance of the relevant or subject device by a check, but also on the importance of one or more access devices for accessing resources of the subject device in the monitored storage system (i.e., in the enterprise environment). As the skilled person will appreciate, the greater the importance of a device in a storage system (e.g., in terms of the device's usage or location in the network topology) the greater the impact of problems associated with the device on the performance of the storage system. In the present invention, the performance of a storage system relates to a desired performance with respect to predefined management criteria, such as enterprise targets, requirements and policies; for the particular storage system. The usage of a device may relate to one or more of: the volume of data or transactions handled by the device per unit time; the number, organizational status and/or priority of users of the device, and the payment or chargeback rate associated with usage of the device. The location of a device may relate to: the physical location (e.g., at a particular site) of the storage system network or a logical location in the network topology.

In example implementations of the present invention, an importance value for each storage access device (e.g., server) of the storage system 30 may be assigned by a user based on knowledge of the storage system 30 (e.g., the topology and usage of devices). The importance values of devices of the storage system 30 may be stored in the CMDB 25. In example implementations of the present invention, ranking subsystem 26 determines a ranking value for each finding of non-compliance of a device (e.g., storage device 32 or networking device 38) of the monitored storage system 30 in a health check report, thereby enabling a plurality of findings of non-compliance to be ordered or ranked according to their relative impact on performance of the storage system 30.

Management system 20 further comprises an input/output (I/O) unit 28 comprising one or more communication interfaces for the communication of data and instructions to and from the management system 20. In particular, I/O unit 28 may include a communication interface for data communications with storage system 30 in accordance with the relevant storage area network protocol (e.g., SCSI). In addition, I/O unit 28 may include one or more communication interfaces for communicating with user devices (not shown in FIG. 1) either locally (e.g., peripherally-connected devices) or over a network (e.g., LAN, WAN or the Internet), as described in further detail below.

Figure 5:
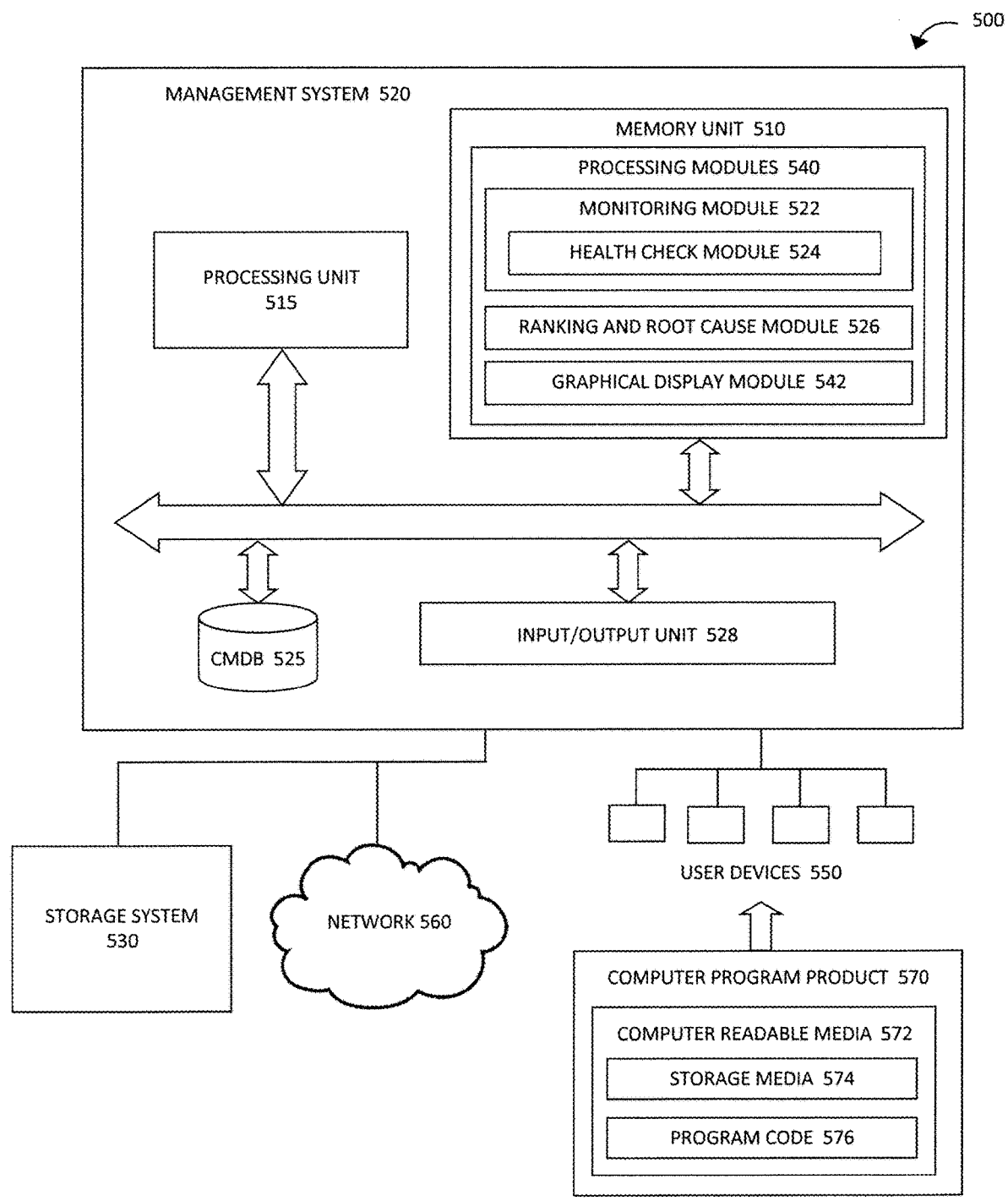
FIG. 5 is a block diagram of a computer system in accordance with example implementations of embodiments of the present invention.

In one embodiment, data storage system 530 in the computer system 500 of FIG. 5 encompasses storage system 30.

Figure 2:
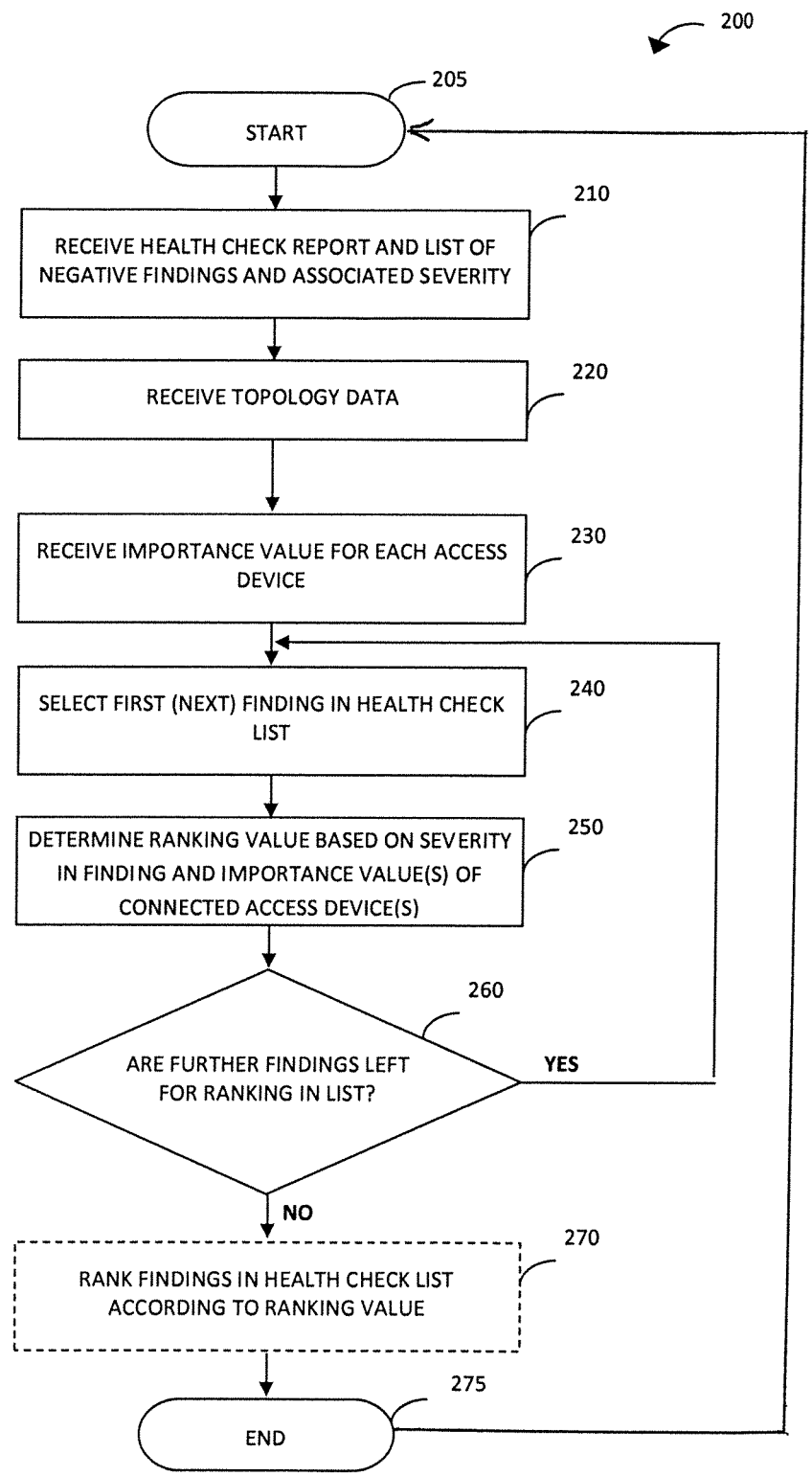
FIG. 2 is a flowchart of a method for ranking health and compliance check findings, in accordance with example implementations of embodiments of the present invention.

FIG. 2 is flowchart of a method 200 for ranking health and compliance check findings, in accordance with example implementations of embodiments of the present invention. In particular, although not exclusively, the method may be implemented in the ranking subsystem 26 of the management system 20 of FIG. 1, as described above.

The method 200 starts at step 205. The method may start in response to the generation of a health check report by another method, upon request by a user or otherwise according to application requirements.

At step 210, the method receives a health check report comprising a list of negative health and compliance check findings for a monitored data storage system. For example, each negative health and compliance check finding may comprise a record having a plurality of data fields comprising information relating to a particular requirement (e.g., systems requirement, enterprise policy etc.) associated with the health check, information associated with the device (or function of the device) found to be non-compliant and information associated with a severity level of the negative finding. Each record may also include other information associated with the negative finding such as detailed information about the failure of the check, the time of the check and, optionally, the values of data parameters (e.g., configuration, security and operational state data parameter values) used to determine the health check finding. In example implementations, step 210 may receive the health check report from another method for performing health and compliance checks. In other example implementations, step 210 may itself generate the report by retrieving parameter data from the monitored storage system, performing health and compliance checks using the retrieved data and predetermined requirements, and generating a current health check report comprising negative health and compliance check findings.

At step 220 the method receives topology data relating to the monitored storage system at the time of the health check report. The topology data may include data that maps one or more access devices (e.g., servers) to each storage device (e.g., disk drive) of the system (or vice versa). In example implementations, step 220 may receive the topology data from another method, for example as part of the method for performing health and compliance checks. In other example implementations, step 220 may itself retrieve data from the monitored storage system to determine the current topology thereof. For example, step 220 may send queries to networking devices and/or storage devices of the storage system for identifiers of access devices (e.g., servers) connected thereto and thus capable of accessing data and resources of each storage device. Such queries may include World Wide Port Name (WWPN) and/or host name queries for access devices, such as host devices, connected to the queried storage or networking device. As the skilled person will appreciate, the data received in response to such queries enables determination of a topology mapping between access devices (e.g., servers) and storage devices of the monitored storage system.

At step 230, the method retrieves predetermined values indicating an importance of access devices, in the storage system. In particular, the importance of an access device (e.g., server) may be a measure of the significance of the device in relation to the performance of the storage system, based on enterprise requirements and policies. As described above, an importance value for each access device (e.g., server) may be predefined by the user, for example based on knowledge of the topological location and usage of the device in normal system se. For example, a production server, which provides primary access to a database accessed by a majority of users of the storage system frequently throughout the day, may be assigned a high importance value while being a test server, which is used solely by a few administrative users on an infrequent basis, may be assigned a low importance value. In example implementations, importance values between 1 and 4 may be defined, where "1" corresponds to a low status device (e.g., test server) and "4" corresponds to a high status device (e.g., a server having highest usage). Default values may be assigned to each access device, or preconfigured by a user, prior to system deployment and may be subsequently varied by the user or otherwise, for example based on observed system usage and or changes to the storage system over time, as required.

At step 240, the method selects a first negative health check finding from the health check report received in step 210. As discussed above, each finding for a check included in a health check report is associated with a subject device of the storage system, such as a storage device or a networking device, and includes a severity value associated with the negative finding.

At step 250, the method determines a ranking value for the negative check finding. The ranking value is determined based on the severity value included in the corresponding health check finding for the subject device and an importance value of one or more access devices connected to, and thus providing access to, the subject device. Thus, the method may use the topology data received in step 220 to identify the access devices connected to, and able to access data and/or resources of, the subject device. The method may further use the importance values received at step 230 to determine the importance value associated with one or more of the identified access devices. The method may then use the determined importance value of at least one of the identified access devices, which are connected to the particular device, to determine the ranking value. Any suitable technique may be used for determining the ranking value in step 250. In example implementations, the ranking value may be determined based on the severity value of the health check finding for subject device and the importance value of the access device connected thereto having the highest importance value. For example, the ranking value (R) may be determined by multiplying the severity value (S) of the finding for the subject device and the highest importance value (I) of the access devices connected to the subject device. In other example implementations, the importance values of more than one of the access devices connected to the subject device may be used in determining the ranking value. For example, the ranking value may be determined by multiplying the severity value (S) of the finding for the subject device by the sum (I) of the importance values of all access devices connected to access resources of the subject device. As the skilled person will appreciate, other techniques for determining a ranking value based on the severity value and at least one importance value of a device connected to, interdependent on or otherwise associated with the subject device are possible and contemplated by the present invention.

The computation of the ranking value (R) array reflect relative weightings of the severity value (S) of the finding for the subject device and the importance value (I) being any measure of the importance value of one or more access devices discussed supra. In the preceding discussion, the ranking value is a product of S and I (i.e., R=S*I). A more general formula for computing the ranking value (R) that reflects the relative weightings of S and I is $R=S^P*I^Q$. In the previous embodiment, P=Q=1, which weights S and I equally. Other embodiments include, inter alia:

(i) P=1 and Q>1 (e.g., Q=2, 3, 4, etc.);
(ii) P=1 and Q<1 (e.g., Q=½, ⅓, ¼, etc.);
(iii) P>1 and Q=1 (e.g., P=2, 3, 4, etc.);
(iv) P<1 and Q=1 (e.g., P=½, ⅓, ¼, etc.);
(v) P<1 and Q>1 (e.g., P=½, ⅓, ¼, etc. and Q=2, 3, 4, etc.);
(vi) P>1 and Q<1 (e.g., P=2, 3, 4, etc. and Q=½, ⅓, ¼, etc.).

Embodiments (i), (iv) and (v) weight I higher than S. Embodiments (ii), (iii) and (vi) weight S higher than I.

At step 260, the method determines whether there are further findings, in the list of negative findings in the health check report received at step 210, to be considered. If step 260 determines that there are further findings to be considered, the method returns to step 240, which selects the next finding and at step 250 determines a ranking value for that next finding. Thus, the method continues in a loop through steps 240, 250 and 260 until ranking values have been determined for all findings in the health check report received at step 210. When step 260 determines that there are no further findings, the method proceeds to step 270.

At optional step 270, the method may rank the findings of the health check report according to the ranking value. For example, step 270 may store the findings from the health check report in a ranked list, or may store an updated health check report with the determined ranking values and any associated data, as required. The stored ranked list and/or stored updated health check report may be accessed and/or communicated to relevant entities (e.g., users, managers, system administrators, etc.) so that the entities would be able to take whatever action is warranted or necessitated by the content of the ranked list and/or updated health check report. The methods 300 and/or 400 of FIG. 3 and/or FIG. 4 may be performed as part of, or immediately after, step 270. The method then ends at step 275.

In one embodiment, the method loops back, from step 275, to step 205 to iteratively repeat performance of the method 200, which represents a real time, iteratively continuous performance of the method 200. This real-time embodiment avoids loss of time in being able to identify and correct, in the shortest possible time, a highly ranked health and compliance issue for any device of data storage devices 32, storage access devices 34, and networking devices 38, in order to maximize performance of the storage system 30, which improves the functioning of the computer system 500 that comprises the storage system 30. In this embodiment, all steps of method 200 are performed in real time. In a variation of this embodiment, the methods 300 and/or 400 of FIG. 3 and/or FIG. 4 may be performed as part of, or immediately after, step 270 and would thus be performed within the real time, iteratively continuous performance of the method 200.

The method of FIG. 2 determines a ranking value for each finding in a health check report, which takes into account the importance (e.g., topological location and/or usage) of an access device for accessing data and/or resources of the subject device, in relation to the performance of the storage system. Accordingly, the ranking value is able to distinguish between non-compliant findings of similar severity and to identify those findings with the highest impact on storage system performance and thus of highest urgency/priority. In this way, the user is able to address the issues associated with findings having higher ranking values first, so as to avoid deterioration of system performance and potential device failures and/or system outages, as illustrated in the example Tables 1 and 2 below.

Table 1 illustrates an example of a health check report received at step 210 of the method 200 of FIG. 2.

TABLE 1

| Record number | Device ID | Severity value (1 to 9) | Severity name | Check Category | Check ID |
|---|---|---|---|---|---|
| 1 | Device 1 | 4 | Major | Configuration | A |
| 2 | Device 1 | 2 | Warning | Status | B |
| 3 | Device 2 | 4 | Major | Configuration | A |
| 4 | Device 2 | 3 | Medium | Configuration | C |
| 5 | Device 2 | 3 | Medium | Status | D |
| 6 | Device 3 | 4 | Major | Configuration | A |
| 7 | Device 3 | 2 | Warning | Status | B |
| 8 | Device 4 | 6 | Critical | Security | E |
| 9 | Device 5 | 4 | Major | Configuration | A |
| 10 | Device 6 | 2 | Warning | Configuration | F |

Each row of Table 1 represents a record of a negative health and compliance check finding and each column represents a data field. In Table 1, the data fields comprise data associated with the non-compliant device including a device identifier ("Device ID") and data associated with the health and compliance check including the category of the check ("Check Category"), which indicates whether the check relates to the configuration, security or operational status of the device and an identifier of the check ("Check ID"), which indicates the particular check such as compliance with a specific requirement. The data fields further include data associated with the severity of the finding including a severity value ("Severity Value") associated with the negative finding, and a corresponding severity level indicator ("Severity Name"), which may be communicated to the user.

In the example illustrated in Table 1, each record of a negative finding has air associated severity value between 1 and 9 based on the corresponding health and compliance check. Thus, for example, the negative determination (for simplicity called "breach" herein) of configuration settings check having check ID "A" has an associated severity value "4", while the breach of status monitoring check having check ID "B" has an associated severity value of "2". As the skilled person will appreciate, the severity value, which is determined in accordance with the implemented health and compliance check processes, is predetermined for each type of health and compliance check. Thus, for example, breach of the security settings check having check ID "E" has a relatively high associated severity value "6", since security breaches are generally considered to be of greater priority to users than, for example, operational status or configuration breaches. Accordingly, based on the health check report in Table 1, the user is directed to address the issue concerning the security breach on Device 4 associated Record Number 8 with the severity "Critical" as the highest priority/urgency, and only afterwards address the configuration breaches on Devices 1, 2, 3 and 5 respectively associated with Record Numbers 1, 3, 6 and 9, with the severity "Major" as the next priority/urgency.

In practice, one or more devices with non-compliant configurations and/or operational status may have a serious impact on the performance of the storage system and may even lead to severe problems such as device failures and system outages. However, the user is unable to determine from the health check report in Table 1 which, if any, of the above health check finding records for configuration breaches with the severity "Major" may lead to a negative impact on system performance.

Table 2 illustrates an example of the health check report of Table 1 with ranking values determined using the method 200 of FIG. 2.

TABLE 2

| Record number | Device ID | Severity value (1 to 9) | Highest Importance Value (1 to 4) | Ranking Value | Check Category | Check ID |
|---|---|---|---|---|---|---|
| 1 | Device 1 | 4 | 3 | 12 | Configuration | A |
| 2 | Device 1 | 2 | 3 | 6 | Status | B |
| 3 | Device 2 | 4 | 1 | 4 | Configuration | A |
| 4 | Device 2 | 3 | 2 | 6 | Configuration | C |
| 5 | Device 2 | 3 | 3 | 9 | Status | D |
| 6 | Device 3 | 4 | 1 | 4 | Configuration | A |
| 7 | Device 3 | 2 | 1 | 2 | Status | B |
| 8 | Device 4 | 6 | 1 | 6 | Security | E |
| 9 | Device 5 | 4 | 4 | 16 | Configuration | A |
| 10 | Device 6 | 2 | 4 | 8 | Configuration | F |

Each row in Table 2 represents a record of a negative health and compliance check finding and each column represents a data field. The columns of Table 2 represent the same data fields as the records in Table 1 (except that the "Severity Name" data field is omitted) together with additional data fields comprising data associated with the ranking of the health and compliance check record including a ranking value ("Ranking Value") and a highest value of the importance values of access devices (e.g., servers) impacted by the finding ("Highest importance Value").

As described above, the method 200 of FIG. 2 uses topology data for the storage system, which, for example, maps access devices (e.g., servers) to storage devices. Thus, when processing a health and compliance check finding for a subject storage device, the method 200 may identify one or more access devices connected to the subject device and impacted by the finding. The method 200 may determine the importance value of each of the connected access devices, for example by looking up their corresponding predefined importance values between 1 and 4, as described above. The method 200 may determine the highest importance value of the connected access devices that are impacted by the negative finding (i.e., the access devices consuming data and/or resources of the subject device associated with the negative finding) in determining the ranking value.

In the example illustrated in Table 2, each record of a negative finding has a ranking value determined by multiplying the severity value (S) by the highest importance value (I) of the impacted access devices R=S*I). Thus, the configuration check finding in Record 9 for Device 5 has a ranking value of "16", since the finding impacts a high priority access device with an importance value of "4". In contrast, the security check finding in Record 8, which had the highest severity value in Table 1, has a ranking value of "6", since the finding impacts on only low priority access devices such as a single test device with an importance value of "1". Accordingly, based on the health check report in Table 2 with ranking values, the user is directed to address the issue concerning the configuration breach on Device 5 associated with Record Number 9 as the highest priority/urgency, since Device 5 has the highest ranking value.

Figure 3:
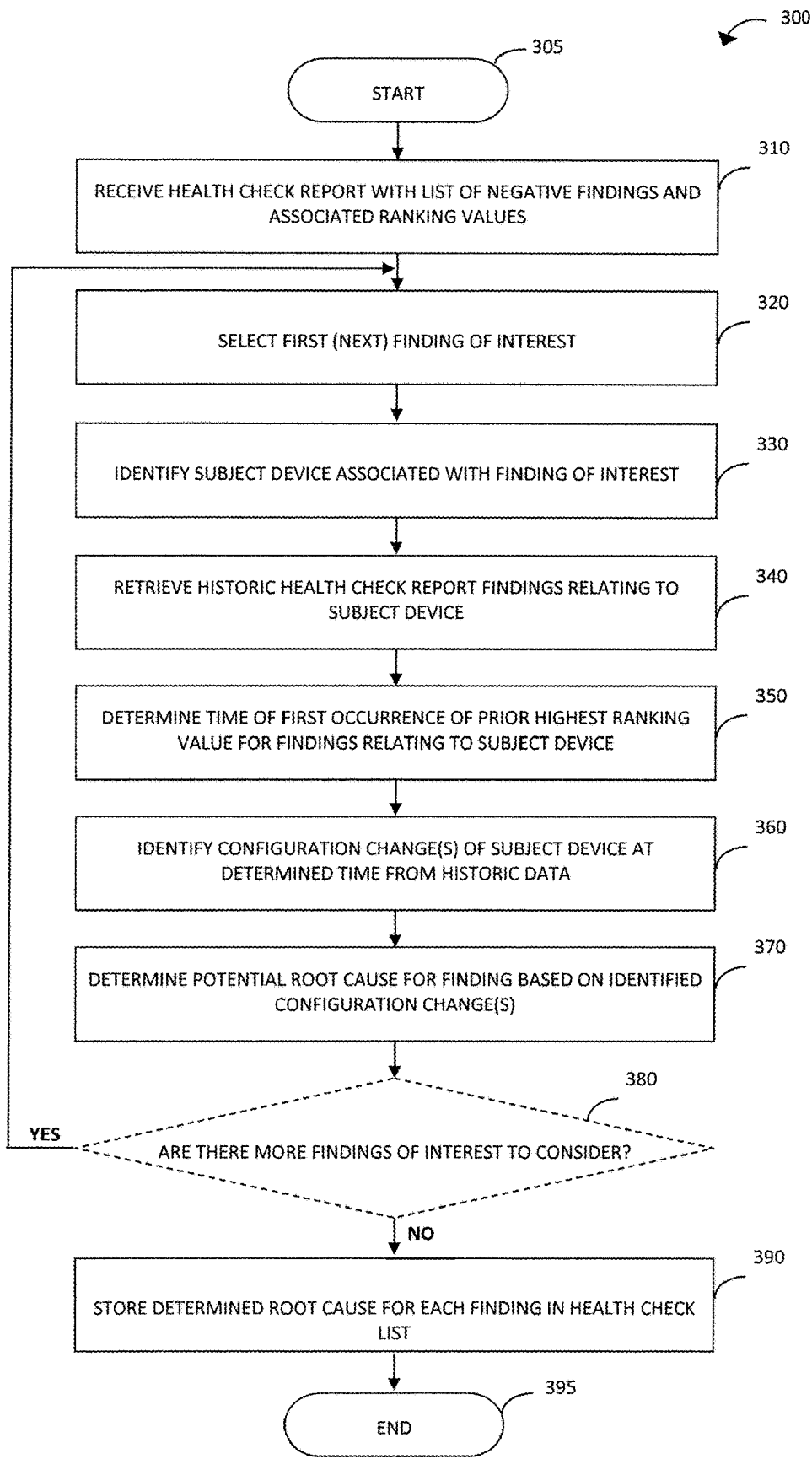
FIG. 3 is a flowchart of a method for determining a root cause associated with ranked health and compliance check findings, in accordance with example implementations of embodiments of the present invention.

FIG. 3 is a flowchart of a method 300 for determining a root cause associated with ranked health and compliance check findings, in accordance with example implementations of embodiments of the present invention. In particular, although not exclusively, the method 300 may be implemented in the ranking subsystem 26 of the management system 20 of FIG. 1. The method 300 may use a health check report having a ranking value associated with each negative compliance and health check finding determined using the method 200 of FIG. 2.

The method 300 starts at step 305. The method may start in response to the generation of a health check report with ranking values by another method, such as the method of FIG. 2, upon request by a user or otherwise according to application requirements.

At step 310, the method receives a health check report comprising a list of negative health and compliance check findings for a monitored data storage system; each finding having an associated ranking value.

At step 320, the method selects a finding of interest from the list of negative health and compliance check findings in the health check report. A finding of interest is typically an unexplained negative health and compliance check finding for which a root cause needs to be determined. In example implementations, a finding of interest may be selected manually by a user, for instance when reviewing the health check report. In other example implementations, a finding of interest may be selected automatically from the findings listed in the health check report based on the ranking value (e.g., the finding with the highest ranking value may be selected).

At step 330, the method identifies the subject device associated with the selected finding of interest. As described above, a record for each finding in the health check report typically includes data associated with the subject device, including a device identifier and, optionally, a device type and other related device information.

At step 340, the method retrieves historic health check report findings relating to the subject device. As the skilled person will appreciate, health check reports may be generated and stored periodically (e.g., hourly, daily, weekly etc.) and may be archived in historic health check records when subsequent health check reports are received. Thus, step 340 may retrieve data from such archived historic health check reports for negative findings relating to the subject device. Typically, the method retrieves data from only recent historic health check reports, such as reports from a preceding time period (e.g., a week or a month), according to application and/or user requirements.

At step 350, the method determines a time at which a prior highest ranking value for findings relating to the subject device first occurred. In example implementations, step 350 may use the data retrieved in step 340 to determine the prior highest ranking value for findings relating to the subject device and the time (e.g., date) on which the determined highest ranking value first occurred. For example, step 350 may scan the data retrieved in step 340 in reverse chronological order to identify the prior highest ranking value and, subsequently, the time at which the identified prior highest ranking value first occurred. In other example implementations, step 350 may use a differences report to determine the time at which the prior highest ranking value for findings relating to the subject device first occurred. For example, a differences report may be generated for devices based on a comparison of ranking values for health and compliance check findings for every successive (e.g., periodic) health check report and/or based on a comparison of raw data values used in determining the ranking values for findings in successive health check reports. In this case, step 350 may scan the differences report in reverse chronological order to identify differences relating to the subject device and the corresponding time.

At step 360, the method identifies one or more configuration changes associated with the subject device at the relevant time determined in step 350. As the skilled person will appreciate, data relating to configuration changes may be determined and recorded during monitoring by a management system for use in generating health check reports. Thus, configuration changes may be recorded in a separate record or may be included in the health check report and/or the above-mentioned differences report. Accordingly, step 360 may identify a configuration change to, or associated with, the subject device that occurred on or around the relevant time. As the skilled person will appreciate, step 360 may determine more than one configuration change to the subject device, or an associated device, on or around a relevant time (e.g., date). In addition, in other example implementations, step 360 may identify other types of changes associated with the subject device, such as operational state changes, on or around the relevant time.

At step 370, the method determines a potential root cause for the finding of interest based on the configuration change(s) to the subject device identified in step 360. For example, step 370 may identify one of more of the configuration changes identified in step 370 as the root cause for the finding of interest.

At step 380, the method determines whether there are more findings of interest to be considered. For example, a user may be prompted to manually indicate whether there are more findings of interest or the method may automatically determine whether there are more findings of interest based on the ranking values of the findings in the health check report.

If step 380 determines that there are more findings of interest to consider, the method returns to steps 320 and a next finding of interest is selected. The method then continues in a loop through step 320 to 380 to determine a potential root cause for the next finding of interest. If step 380 determines that there are no more findings of interest to consider, the method proceeds to step 390.

At step 390, the method stores data relating to the determined potential root cause for each of the findings of interest. For example, the potential root cause may be stored in an updated health check report (e.g., in a separate data field of the finding of interest), Step 390 may store data relating to an identified root cause for a finding of interest, for example including the data associated with the configuration change (e.g., type of change, time change was made) and corresponding device. The method then ends at step 395.

In one embodiment, the method 300 is performed in real time.

Figure 4:
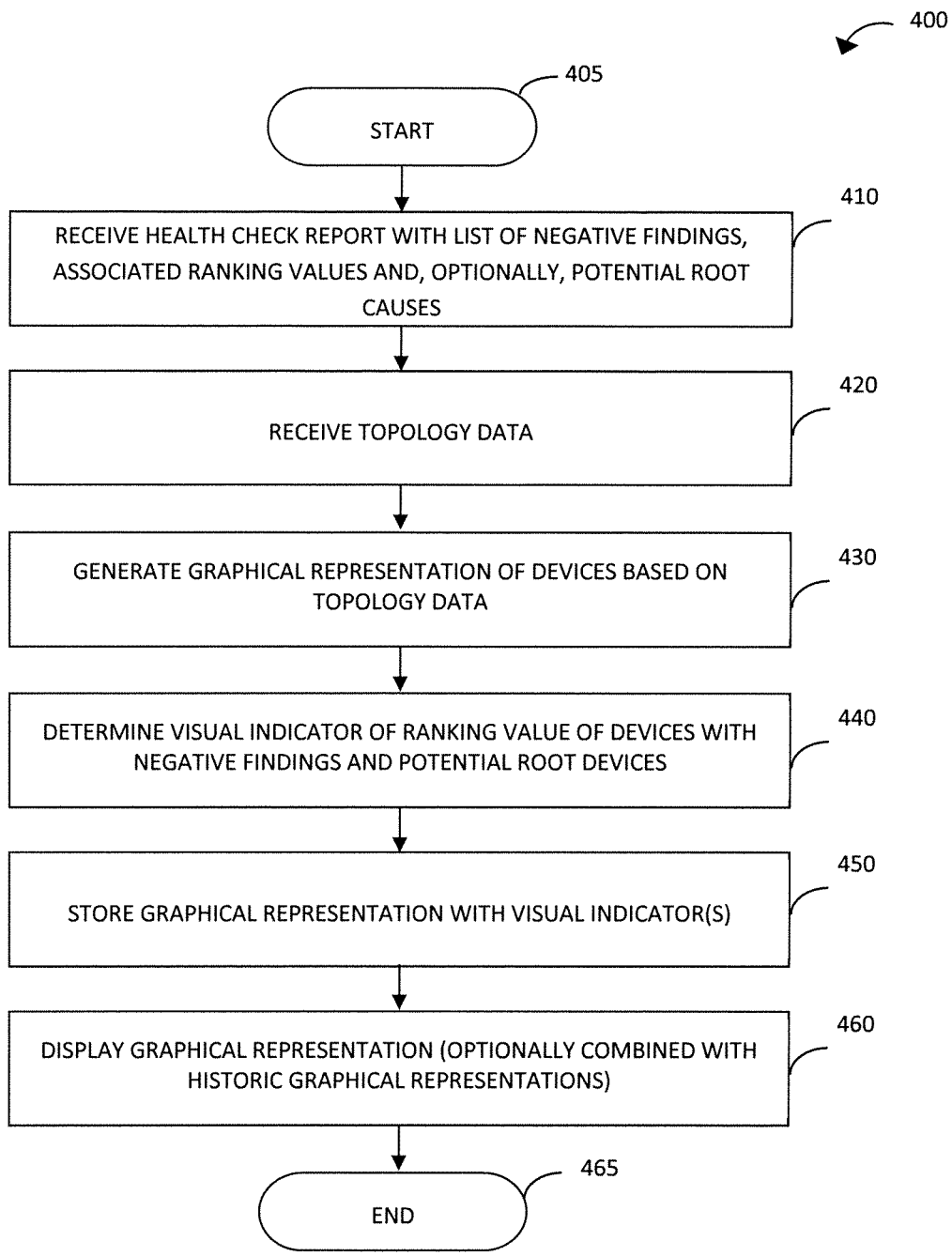
FIG. 4 is a flowchart of a method for displaying ranked health and compliance check findings, in accordance with example implementations of embodiments of the present invention.

FIG. 4 is a flowchart of a method 400 for displaying ranked health and compliance check findings, in accordance with example implementations of embodiments of the present invention. In particular, although not exclusively, the method 400 may be implemented in the ranking subsystem 26 of the management system 20 of FIG. 1 or may be implemented in a graphical display subsystem (not shown).

The method 400 may use a health check report having a ranking value associated with each negative compliance and health check finding determined using the method 200 of FIG. 2 and/or a health check report with ranking values and potential root causes determined using the method 300 of FIG. 3.

The method 400 starts at step 405. The method may start in response to the generation of a health check report with ranking values and, optionally, potential root causes by another method, such as the method of FIG. 2 or the method of FIG. 3, upon request by a user or otherwise according to application requirements.

At step 410, the method receives a health check report comprising a list of negative health and compliance check findings for a monitored data storage system, each finding having an associated ranking value and, optionally, comprising potential root causes.

At step 420, the method receives topology data for the monitored data storage system at the time of the health check report. As described above in relation to step 220 of FIG. 2, topology data relating to the monitored storage system may be obtained as part of a method for health and compliance monitoring or another management system process.

At step 430, the method generates a graphical representation of the devices of the monitored data storage system based on the received topology data. For example, the graphical representation may comprise a map or connection graph, in which storage and networking devices are represented by icons and storage area network connections (i.e. network cables) are represented by lines between icons. As the skilled person will appreciate, methods for generating a map or connection graph that provides a visual aid for a user to understand the arrangement of a network of devices are known in the art. U.S. Pat. No. 8,311,979B entitled "Methods and System for Importing an Application and Server Map to a Business Systems Manager Display" and U.S. Pat. No. 7,398,434B entitled "Computer Generated Documentation Including Diagram of Computer System", both assigned to International Business Machines Corporation of Armonk, N.Y. disclose suitable methods that may be used in step 430. As the skilled person will appreciate, the present invention is not limited to the methods disclosed in the aforementioned patents. On the contrary, step 430 may use any suitable method for generating a graphical representation of the devices of the storage system, whether now known or developed in the future.

At step 440, the method determines a visual indicator of ranking values of devices with negative findings in the health check report received at step 410 and, optionally, of potential root cause devices. In particular, step 440 may determine a visual indicator for devices, to be used in the graphical representation of the storage system generated in step 430. For example, the visual indicator may be a color coding for a device or associated connection for a health check finding, which indicates the level of the corresponding ranking value and/or which indicates that the device or associated connection is identified as a root cause in a health check finding. In the case of multiple findings in relation to a subject device, the visual indicator may comprise a color coding with a color gradient indicative of an overall impact of the findings for the device based on their respective ranking values.

At step 450, the method stores the graphical representation generated in step 430 and the determined visual indicators determined in step 440.

At step 460, the method displays the graphical representation together with the determined visual indicators. For example, the method may display the graphical representation comprising color-coded icons to represent devices, and color-coded lines to represent network cable as a map or connection graph of the storage system (i.e., storage area network). In example implementations, the graphical representation may be displayed as a still image of the map or connection graph, in which case, the user may be able to "zoom in/out" of the map to show more detail, such as information associated with the health check findings, or use filters to display only selected parts of the network and/or information. In other example implementations, the graphical representation may be included in a sequence of corresponding historic graphical representations that may be played in a moving sequence or video to reveal changes over time. Step 460 may be performed automatically, in response to receiving a user request for the display of the graphical representation, or otherwise according to application and/or user requirements. The method then ends at step 465.

In one embodiment, the method 400 is performed in real time.

FIG. 5 is a block diagram of a computer system 500, in accordance with example implementations of embodiments of the present invention. In particular, the illustrated system 500 may be used for management of a data storage system using methods in accordance with example implementations of the present disclosure, as described above.

System 500 comprises a management system 520 including a configuration management database (CMDB) 525 configured for storing data associated with management of a data storage system 530. In one embodiment, data storage system 530 encompasses storage system 30 in FIG. 1. Management system 520 further comprises a memory unit 510 storing processing modules 540 configured for management of data storage system 530 using data stored in CMDB 525 and/or received from data storage system 530 in accordance with example implementations of the present disclosure. Management system 520 further comprises one or more processing units 515 configured for processing management data stored in CMDB 525, for example by executing program code of the processing modules 540. In addition, management system 520 comprises an input/output (I/O) unit 528, such as a communication interface, configured for data communication with user devices 550. Such user devices 550 may include peripheral interface devices (such as keyboard, mouse, display, touch screen and touch pad) and/or any other suitable device for enabling the user to input data into and/or receive data from system 520. In addition, as shown in FIG. 5, I/O unit 528 may be configured for data communication with storage system 530 and, optionally, a data communications network 560 such as a LAN, WAN or the Internet.

As shown in FIG. 5, the processing modules 540 in memory unit 510 include a monitoring module 522 for monitoring configuration, security and/or operational state parameters of devices of the storage system 530 for compliance with one or more predetermined requirements (e.g., system requirements or policies), in accordance with example implementations of the present invention as described above. The monitoring module 522 may include a health check module 524 for performing health and compliance checks, in accordance with example implementations of the present invention as described above. In addition, the processing modules 540 further include a ranking and root cause module 526 for determining a ranking value for each finding of non-compliance by the health check module 524 and determining a root cause for a finding of non-compliance, in accordance with example implementations of the present invention as described above with reference to FIGS. 2 and 3. Finally, the processing modules 540 may also include a graphical display module 242 for generating, storing and displaying a graphical representation of the monitored storage system 530, in accordance with example implementations of the present invention as described above with reference to FIG. 4.

A user of management system 520, such as a systems administrator, may input user data by means of user devices 550 or a user device connected to network 560. For example, a user may input or modify importance values for access devices of the storage system for use in step 530 of the method of FIG. 2. In addition, the user may select findings of interest in step 320 of the method of FIG. 3 or request the display of a graphical representation in step 460 of the method of FIG. 4. As the skilled person will appreciate, many other types of user inputs to the management system 520 are possible and contemplated by the present invention.

In example implementations of the present invention, a computer program product 570 may be provided, as shown in FIG. 5. The computer program product 570 may include a computer readable media 572 having storage media 574 and program instructions 576 (i.e., program code) embodied therewith. The program instructions 576 may be loaded onto memory unit 510 of management system 520 via I/O unit 528, for example by one of user devices 550. The program instructions 576 may comprise any one or more of the above-described processing modules 540, including monitoring module 522, health check module 524; ranking and root cause module 526 and graphical display module 542 of management system 520. The program instructions 576 may be executable by the processing unit 515 of management system 520 to perform methods for processing health check findings as described above with reference to FIGS. 2, 3 and 4.

While the above-described example implementations relate to a storage network environment, the skilled person will appreciate that the teachings of the present disclosure may be applied to the management of devices in other networked environments. Thus, for example, the disclosed methods may be used in the monitoring a network of so-called Smart devices such as Smart phones, Web cameras, Set-top boxes etc., that are connected to a domestic or enterprise network and configured to be accessed remotely. The resources (e.g., memory) of each Smart device may be accessed directly or via a suitable access device within the network. In this case, an importance value may be assigned to a Smart device or an access device, as appropriate, in the same way as an importance value is assigned to the storage access devices in the above-described example implementations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, comprising:

receiving, by one or more processors of a computer system, a health and compliance check report for a network comprising a plurality of devices, wherein each device of the plurality of devices is a different data storage device in a storage system within the computer system, wherein the report comprises a list of health and compliance check findings at a particular time, each finding indicating a determination of non-compliance of a subject device of the plurality of devices with a predetermined requirement and including a severity value (S) associated with the determination of non-compliance of the subject device;

receiving, by the one or more processors, topology information for the network at the particular time, wherein the topology information identifies one or more access devices connected to the subject device within a computer network topology, said plurality of access devices providing access to resources of the subject device;

for each finding in the report pertaining to the subject device, determining, by the one or more processors an importance value (I) of each access device connected to the subject device, each access device s importance value (I) being indicative of the access device s usage or location in the computer network topology;

for each finding in the report, computing, by the one or more processors, a ranking value (R) that is a monotonically increasing function of both the severity value (S) of the subject device and the importance value (I) of each access device connected to the subject device, wherein a highest determined ranking value is for one access device of the plurality of access devices connected to the subject device, wherein said computing the ranking value (R) comprises computing R according to $R = S^P * I^Q$, and wherein P and Q are selected from the group consisting of P=1 and Q=1,
P=1 and Q>1,
P=1 and Q<1,
P>1 and Q=1,
P<1 and Q=1,
P<1 and Q>1, and
P>1 and Q<1; and correcting a compliance issue pertaining to the one access device connected to the subject device, which improves performance of the storage system and improves a functioning of the computer system that includes the storage system.

2. The method of claim 1, wherein said determining the importance value for each access device connected to the subject device comprises:
using the topology information to determine the importance value of each access device connected to the subject device.

3. The method of claim 1, wherein the obtained importance values are predefined for the one or more access devices.

4. The method of claim 1, wherein the importance value for each device of the one or more access devices connected to the subject device is defined based on one or more parameters selected from the group consisting of device usage, device type device function, device topological location on the network, and combinations thereof.

5. The method of claim 1, said method further comprising:
receiving, by the one or more processors, a selection of a finding in the report for the subject device;
obtaining, by the one or more processors, historic findings for the subject device, each historic finding including a respective ranking value;
determining, by the one or more processors from the historic findings for the subject device, an initial time of a prior highest ranking value;
identifying, by the one or more processors, changes at the determined initial time to one device selected from the group consisting of the subject device and a device associated with the subject device; and
determining, by the one or more processors, at least one change of the identified changes to the one device as a root cause of the selected finding.

6. The method of claim 5, wherein said identifying changes to the one device at the determined initial time comprises identifying configuration changes to the one device.

7. The method of claim 5, wherein said determining, from the historic findings for the subject device, the initial time of a prior highest ranking value comprises:
scanning the historic findings for the subject device in reverse chronological order to identify the prior highest ranking value and the initial time.

8. The method of claim 1, said method further comprising:
receiving, by the one or more processors, topology information for the network at the particular time, wherein the topology information indicates connections between devices on the network; and
generating, by the one or more processors, a graphical representation of the network at the particular time, based on the topology information, the health check findings, and the ranking values.

9. The method of claim 8, wherein the graphical representation includes a visual indicator for the one or more devices connected to the subject device, and wherein the visual indicator is associated with at least one ranking value of one or more findings for the respective subject device.

10. A computer program product, comprising one or more computer readable hardware storage devices having computer readable program code stored therein, said program code containing instructions executable by one or more processors of a computer system to implement a method, said method comprising:
receiving, by the one or more processors, a health and compliance check report for a network comprising a plurality of devices, wherein each device of the plurality of devices is a different data storage device in a storage system within the computer system, wherein the report comprises a list of health and compliance check findings at a particular time, each finding indicating a determination of non-compliance of a subject device of the plurality of devices with a predetermined requirement and including a severity value (S) associated with the determination of non-compliance of the subject device;
receiving, by the one or more processors, topology information for the network at the particular time, wherein the topology information identifies one or more access devices connected to the subject device within a computer network topology, said one or more access devices providing access to resources of the subject device;
for each finding in the report pertaining to the subject device, determining, by the one or more processors an importance value (I) of each access device connected to the subject device, each access device s importance value (I) being indicative of the access device s usage or location in the computer network topology;
for each finding in the report, computing, by the one or more processors, a ranking value (R) that is a monotonically increasing function of both the severity value (S) of the subject device and the importance value (I) of each access device connected to the subject device, wherein a highest determined ranking value is for one access device of the plurality of access devices connected to the subject device, wherein said computing the ranking value (R) comprises computing R according to $R=S^{P}*I^{Q}$, and wherein P and Q are selected from the group consisting of
P=1 and Q=1,
P=1 and Q>1,
P=1 and Q<1,
P>1 and Q=1,
P<1 and Q=1,
P<1 and Q>1, and
P>1 and Q<1; and
correcting a compliance issue pertaining to the one access device connected to the subject device, which improves performance of the storage system and improves a functioning of the computer system that includes the storage system.

11. The computer program product of claim 10, wherein said determining the importance value for each access device connected to the subject device comprises:
using the topology information to determine the importance value of each access device connected to the subject device.

12. The computer program product of claim 10, wherein the obtained importance values are predefined for the one or more access devices.

13. The computer program product of claim 10, wherein the importance value for each device of the one or more access devices connected to the subject device is defined based on one or more parameters selected from the group consisting of device usage, device type device function, device topological location on the network, and combinations thereof.

14. A computer system, comprising one or more processors, one or more memories, and one or more computer readable hardware storage devices, said one or more hardware storage device containing program code executable by the one or more processors via the one or more memories to implement a method, said method comprising:
receiving, by the one or more processors, a health and compliance check report for a network comprising a plurality of devices, wherein each device of the plurality of devices is a different data storage device in a storage system within the computer system, wherein the report comprises a list of health and compliance check findings at a particular time, each finding indicating a determination of non-compliance of a subject device of the plurality of devices with a predetermined requirement and including a severity value (S) associated with the determination of non-compliance of the subject device;

receiving, by the one or more processors, topology information for the network at the particular time, wherein the topology information identifies one or more access devices connected to the subject device within a computer network topology, said one or more access devices providing access to resources of the subject device;

for each finding in the report pertaining to the subject device, determining, by the one or more processors an importance value (I) of each access device connected to the subject device, each access device s importance value (I) being indicative of the access device s usage or location in the computer network topology;

for each finding in the report, computing, by the one or more processors, a ranking value (R) that is a monotonically increasing function of both the severity value (S) of the subject device and the importance value (I) of each access device connected to the subject device, wherein a highest determined ranking value is for one access device of the plurality of access devices connected to the subject device, wherein said computing the ranking value (R) comprises computing R according to $R=S^P*I^Q$, and wherein P and Q are selected from the group consisting of P=1 and Q=1,
P=1 and Q>1,
P=1 and Q<1,
P>1 and Q=1,
P<1 and Q=1,
P<1 and Q>1, and
P>1 and Q<1; and correcting a compliance issue pertaining to the one access device connected to the subject device, which improves performance of the storage system and improves a functioning of the computer system that includes the storage system.

15. The computer system of claim 14, wherein said determining the importance value for each access device connected to the subject device comprises:
using the topology information to determine the importance value of each access device connected to the subject device.

16. The computer system of claim 14, wherein the obtained importance values are predefined for the one or more access devices.

17. The computer system of claim 14, wherein the importance value for each device of the one or more access devices connected to the subject device is defined based on one or more parameters selected from the group consisting of device usage, device type device function, device topological location on the network, and combinations thereof.

* * * * *